United States Patent
Podolsky et al.

[15] 3,705,702
[45] Dec. 12, 1972

[54] VIBRATION-ABSORBING SUPPORT

[72] Inventors: Viktor Grigorievich Podolsky; Iosif Mikhailovich Balkarei; Sergei Mikhailovich Grigoriyants, all of Kharkov, U.S.S.R.

[73] Assignee: Prodktny I Nanchno-Isslidovatelsky Institut, Kharkov, U.S.S.R.

[22] Filed: July 14, 1971

[21] Appl. No.: 162,351

[52] U.S. Cl. ............................. 248/20, 248/358 R
[51] Int. Cl. .................................... F16f 15/00
[58] Field of Search .............. 248/20, 21, 358 R

[56] References Cited

UNITED STATES PATENTS

| | | |
|---|---|---|
| 1,885,443 | 11/1932 | Holt .................. 248/21 |
| 2,158,890 | 5/1939 | Antelme .............. 248/21 |
| 2,582,363 | 1/1952 | Thiry ............. 248/358 R |
| 3,658,314 | 4/1972 | Luzsicza ......... 248/358 R |

FOREIGN PATENTS OR APPLICATIONS 112,329  10/1964  Czechoslovakia ........... 248/358 R

*Primary Examiner*—Marion Parsons, Jr.
*Attorney*—Eric H. Waters et al.

[57] ABSTRACT

A support including a rod having at its end faced elastic disks connected in pairs along the perimeter and made so that within each pair there is provided a space filled with an incompressible medium.

1 Claim, 1 Drawing Figure

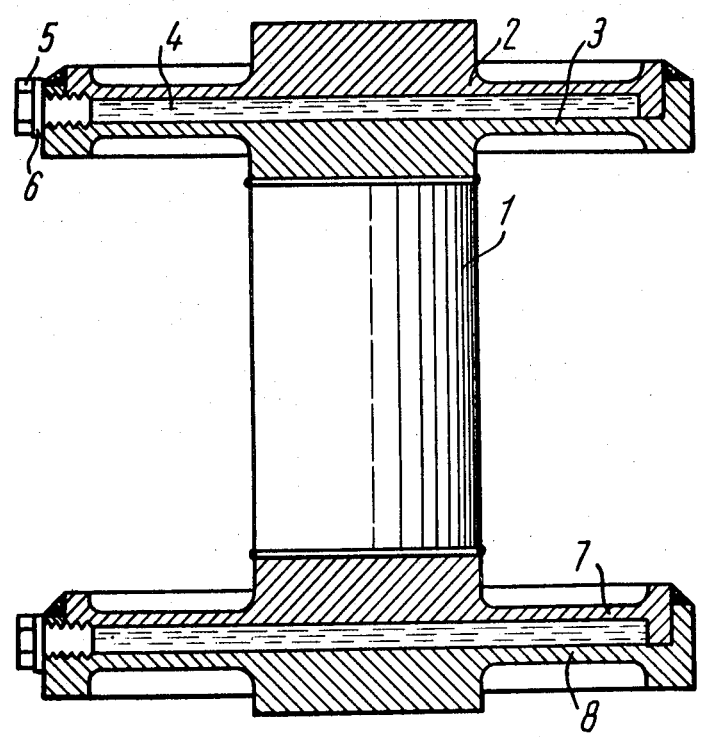

VIBRATION-ABSORBING SUPPORT

The present invention relates to vibration-absorbing supports designed for reducing dynamic loads of machines on structural supporting members.

Known in the art are vibration-absorbing supports for machines with horizontal dynamic loads including a rod having one end mounted on a foundation and the other end supporting a machine which a source of vibration (cf. the book by A.M.Alkeseev et al. "Ship Vibration Absorbers," 1962).

A significant disadvantage of rod-type vibration-absorbing supports consists in that they cannot be used for absorbing vibration of heavy low-frequency machines since they must take large vertical loads at a low horizontal stiffness and this results in poor stability of the rod.

Also known in the art is a suspension of a machine featuring heavy horizontal loads by means of ropes (cf. USSR Author's Certificate No. 211224, cl. 47a, 20).

These suspensions are disadvantageous in that the ropes are stretched during operation and this results in a change in the horizontal position of the machine.

Another disadvantage of these suspensions consists in that they hinder the access to the machine.

An object of the present invention is to eliminate the above-mentioned disadvantages.

Another object of the invention is to provide for a vibration-absorbing support which ensures low frequency of natural oscillation of the machine in a horizontal direction at a high carrying capacity of the support in a vertical direction.

These objects are attained by providing a vibration-absorbing support in the form of a rod having one end resting on a foundation and having another end supporting a machine which is a source of vibration; according to the invention, mounted at the end faces of the rod are elastic disks connected in pairs along the perimeter, each pair having an inner chamber filled with a movable incompressible medium.

Such a construction of the proposed vibration-absorbing support provides for a low flexural rigidity of the disks.

Another advantage of the proposed vibration-absorbing support consists in that the disks have a high supporting power in a vertical direction at the expense of the movable incompressible medium which fills the chamber between each part of the disks.

Owing to these features of the proposed support it is possible to obtain very low natural oscillation frequency of the machine in a horizontal direction within approximately 0.5 to 1 c/s.

The invention will be better understood from the following detailed description of the invention with reference to the accompanying drawing illustrating a longitudinal sectional view of the proposed vibration-absorbing support.

The proposed vibration-absorbing support consists of a rod I on the end faces of which there are mounted elastic disks 2,3 and elastic disks 7,8. In the center of the elastic disks 2,3 and 7,8 there are provided cylindrical projections.

The cylindrical projections 3 and 7 are connected directly with the rod while the cylindrical projections 2 and 8 are fixed to the machine and foundation respectively. In each pair the elastic disks 2,3 and 7,8 are interconnected along the perimeter. The chamber 4 provided within each pair of elastic disks 2,3 and 7,8 is filled with a movable incompressible medium such as liquid or uncured rubber. The movable incompressible medium is introduced through the orifice which is closed by a plug 5 through a gasket washer 6.

In the embodiment of the invention under consideration two elastic disks are disposed at each end face of the rod, yet several pairs of such disks, connected in pairs along the perimeter, can be used.

During the horizontal translatory motion of the machine the upper cylindrical projection moves together with the machine, while the lower cylindrical projection bearing on the foundation remains stationary. The machine, which is a source of vibration, carries the upper cylindrical projection making the elastic disks 2,3 and 7,8 to turn about a horizontal axis perpendicular to the motion of the machine. In this case the rod I rigidly connected to the disks 2,3 and 7,8 occupies an inclined position, therefore, the dynamic loads are reduced and practically are not transferred to the foundation.

The proposed vibration-absorbing support is preferably used for reducing the action of vibratory loads on foundations of heavy high-power machines subject to horizontal dynamic loads, for example, cone and jaw crushers. The use of the proposed construction makes it possible to reduce periodic horizontal loads by a factor of 20 to 30, to eliminate the transmission of the horizontal impulse forces appearing in the process of crushing a material, and to considerably reduce the transmission of the vertical impulse forces, for example in gyratory breakers processing hardly breakable bodies.

The application of vibration-absorbing devices for breakers is also very useful for modernization of the crushing systems. In this case it is possible to install more powerful breaking equipment on existing foundations.

Reduction of dynamic loads allows one to change and lighten the structures of foundation to provide for obtaining better operating conditions and low service cost of the equipment.

We claim:

1. A vibration-absorbing support including a rod, elastic disks mounted at the end faces of said rod and connected in pair along the perimeter, a chamber within each two paired disks, a movable incompressible medium filling said chamber.

* * * * *